United States Patent
Chen et al.

[11] Patent Number: 5,999,384
[45] Date of Patent: Dec. 7, 1999

[54] CIRCUIT INTERRUPTER WITH ARCING FAULT PROTECTION AND PTC (POSITIVE TEMPERATURE COEFFICIENT RESISTIVITY) ELEMENTS FOR SHORT CIRCUIT AND OVERLOAD PROTECTION

[75] Inventors: William W. Chen, Marion; Andy A. Haun, Cedar Rapids; George D. Gregory, Iowa City; Gary W. Scott, Mount Vernon, all of Iowa

[73] Assignee: Square D Company, Palatine, Ill.

[21] Appl. No.: 09/129,156

[22] Filed: Aug. 5, 1998

Related U.S. Application Data

[63] Continuation-in-part of application No. 08/918,768, Aug. 25, 1997, Pat. No. 5,886,860, and a continuation-in-part of application No. 09/054,153, Apr. 2, 1998, Pat. No. 5,933,311.

[51] Int. Cl.$^6$ ................................................... H02H 3/00
[52] U.S. Cl. ...................... 361/42; 361/93.6; 361/93.7; 361/93.8; 361/93.9; 361/106
[58] Field of Search ............................ 361/42–50, 93.1, 361/93.6, 93.7, 93.8, 99, 100, 102, 106, 93.9

[56] References Cited

U.S. PATENT DOCUMENTS

| | | | |
|---|---|---|---|
| 4,233,640 | 11/1980 | Klein et al. | 361/44 |
| 4,616,200 | 10/1986 | Fixemer et al. | 335/35 |
| 4,702,002 | 10/1987 | Morris et al. | 29/837 |
| 4,816,958 | 3/1989 | Belbel et al. | 361/93 |
| 4,931,894 | 6/1990 | Legatti | 361/45 |
| 5,121,282 | 6/1992 | White | 361/42 |
| 5,459,630 | 10/1995 | MacKenzie et al. | 361/45 |
| 5,590,010 | 12/1996 | Ceola et al. | 361/93 |
| 5,629,658 | 5/1997 | Chen | 335/201 |
| 5,682,101 | 10/1997 | Brooks et al. | 324/536 |
| 5,691,869 | 11/1997 | Engel et al. | 361/42 |
| 5,805,397 | 9/1998 | MacKenzie | 361/42 |
| 5,805,398 | 9/1998 | Rae | 361/42 |
| 5,815,352 | 9/1998 | Mackenzie | 361/42 |
| 5,818,237 | 10/1998 | Zuercher et al. | 324/536 |
| 5,818,671 | 10/1998 | Seymour et al. | 361/42 |
| 5,835,319 | 11/1998 | Welles, II et al. | 361/5 |
| 5,835,321 | 11/1998 | Elms et al. | 361/45 |

*Primary Examiner*—Michael J. Sherry
*Attorney, Agent, or Firm*—Kareem I. Irfan; Larry I. Golden

[57] ABSTRACT

A circuit protection apparatus employs a PTC element for overload and/or short circuit protection and an arcing fault interruption arrangement. The circuit protection apparatus may be employed in a ground fault receptacle for interrupting the flow of electrical current in a line in response to any of a plurality of different types of fault conditions on the line. The circuit protection apparatus may include a set of contacts connected in series with the line, and having an open position and a closed position, a trip device coupled to the contacts, adapted to be actuated by a trip signal, to move the contacts from the closed position to the open position and an element having a positive temperature coefficient of resistivity (PTC) connected in series with the contacts. The PTC element is connected to the trip device to provide the trip signal to the device in response to overload or short circuit conditions in the line. A switching element is operatively coupled with the trip device for providing the trip signal to said device in response to an actuating signal. An arcing fault circuit is adapted for detecting an arcing fault in the line and producing the actuating signal when the arcing fault is detected.

24 Claims, 4 Drawing Sheets

CIRCUIT INTERRUPTER WITH ARCING FAULT PROTECTION AND PTC (POSITIVE TEMPERATURE COEFFICIENT RESISTIVITY) ELEMENTS FOR SHORT CIRCUIT AND OVERLOAD PROTECTION

CROSS REFERENCED TO RELATED APPLICATIONS

This application is a continuation-in-part of applications Ser. No. 08/918,768, filed Aug. 25, 1997 (attorney's docket no. CRC-84) now U.S. Pat. No. 5,886,860 and Ser. No. 09/054,153, filed Apr. 2, 1998 (attorney's docket CRC-102) now U.S. Pat. No. 5,933,311. The disclosures of these prior applications are incorporated herein by reference.

FIELD OF THE INVENTION

The invention relates generally to the use of elements with positive temperature coefficient resistivity (PTC) in circuit interrupter devices, and more particularly to the use of PTC elements for short circuit and overload protection with arcing fault circuit interrupters (AFCI) and ground fault circuit interrupters (GFCI).

BACKGROUND OF THE INVENTION

Circuit interrupters such as circuit breakers are widely used in residential and industrial applications for the interruption of electrical current in power lines upon the occurrence of various fault conditions such as severe overcurrent caused by short circuits or by ground faults. A ground fault circuit interrupter (GFCI) is one which interrupts a circuit if it detects a leakage current to ground, usually called a ground fault. GFCIs are often provided in household type electrical receptacles which are often mounted in the home in places like bathrooms and kitchens to protect against such short circuits or leakage to ground due to water or moisture or the like entering the protective circuit or an appliance or device connected to the protective circuit. However, the GFCI circuit generally requires that it be coupled in a circuit protected by a circuit breaker in order to protect the circuit from overload and short circuit conditions. That is, an ordinary circuit breaker generally provides these overload and short circuit functions in connection with a GFCI receptacle.

Another type of electrical fault, namely arcing faults, also may occur in circuits which are protected by both GFCI receptacles and circuit breakers. These arcing faults are unintended arcs either from line to line or from line to ground. While conventional circuit breakers may detect relatively high level currents or voltages and interrupt the circuit, they generally cannot detect relatively low-level arcs. However, many low-level arcs should also be protected against. Generally speaking, there is existing technology for protecting against arcing faults, namely arc fault circuit interrupter (AFCI) products, such as those available from Square D Company, the assignee of this application.

Another problem associated with the process of interruption of the current during severe overcurrent conditions is arcing. Arcing occurs between the contacts of circuit breakers and/or ground fault interrupters used to interrupt the current, and is undesirable for several reasons. Arcing can cause deterioration of the contacts of the breaker and, can cause gas pressure to build up. It also necessitates circuit breakers and/or GFCIs with larger separation between the contacts in the open position to ensure that the arc does not persist with the contacts in the fully open position.

Prior art devices have used a number of approaches to limit the occurrence of arcing. In heavy duty switchgear, the circuit breaker contacts may be enclosed in a vacuum or in an atmosphere of $SF_6$. Both of these approaches are expensive. Besides, $SF_6$ has been identified as a greenhouse gas.

Another approach that has been used in circuit breakers to limit the amount of arcing is the use of a resistor connected in parallel with the main contacts of the circuit breaker. Upon opening of the main contacts, current can still flow through the shunt resistor, effectively reducing the amount of arcing in the main contacts. The current flowing through the resistor is less than the short circuit current that would flow through the main contacts in the absence of the resistor, and the opening of a second pair of contacts connected in series with the resistor can be accomplished with less arcing that would occur in the absence of the shunt resistor.

Khalid (U.S. Pat. No. 4,070,641) teaches a current limiting circuit breaker in which the current limiting contacts are in series with the main contacts of a breaker. Opening of the limiting contacts shunts high fault current through the resistor. The resistor is an iron wire resistor with a positive temperature coefficient (PTC) of resistance. The flow of the short circuit current through the resistor heats the resistor thereby increasing its resistance and limiting the buildup of the short circuit current.

Perkins et al. ("IEEE Transactions on Components, Hybrids, and Manufacturing Technology," CHMT-5, *A New PTC Resistor For Power Applications*, pgs. 225–230, June 1982) describes a PTC resistor that utilizes the metal-insulator solid state transition in $(V, Cr)_2O_3$. At a transition temperature of 80° C., the resistivity of a ceramic body including $(V, Cr)_2O_3$ increases to a value 100 times the value at 20° C. They disclose the use of a PTC element for overcurrent protection as a substitute for a bimetallic strip for overcurrent protection. The switch is connected to a PTC element that is shunted by the actuating coil for the switch. During normal operating conditions, the current flows through the PTC resistor. During short circuit conditions, the rapid heating of the PTC resistor leads to an increased resistance and voltage across the PTC resistor, diverting current through the actuating coil which then trips the switch.

Hansson et al. (U.S. Pat. No. 5,382,938) discloses a PTC element that is capable of withstanding short circuit currents without damage, thereby enabling it to be reused, as an overcurrent protection device for a motor. The PTC element is connected in series with a switch and in parallel with an excitation coil that operates the switch. An overcurrent in the circuit heats the PTC element and at a certain temperature, its resistance rises sharply. The voltage across the PTC element is then sufficient to cause the excitation coil to trip the switch. Hansson et al. (WO 91/12643) discloses a more complicated invention for motor and short circuit protection using a PTC element. A switch is connected in series with a tripping circuit consisting of two parallel connected current branches. One of these branches has the excitation coil for the switch while the other branch has two PTC resistors. Overcurrent conditions cause a buildup of voltage across the PTC resistors that then activates the excitation coil for the switch.

Chen (U.S. Pat. No. 5,629,658) discloses a number of devices in which PTC elements are used in conjunction with two or more switches to limit the current under short circuit conditions and thereby reduce the associated arcing. Chen uses a PTC element in a circuit breaker for absorbing the so-called "interruption" energy which could otherwise produce arcing during breaker operation.

Legatti (U.S. Pat. No. 4,931,894) is directed to a ground fault interrupter (GFCI) circuit which utilizes a GFCI differential transformer. A secondary winding is provided on the core of the GFCI transformer for producing a detectable signal in response to an arcing current between a power line and the grounded metal sheath or cover of a power cable, by connecting the secondary winding in series between the metal sheath and the neutral line. Among other things, this circuit requires the provision of a separate ground line and a separate wire for connection to the cable sheath.

Yet another approach used to reduce arcing in circuit breakers involves the use of mechanical means to break the arc. Belbel et al. (U.S. Pat. No. 4,562,323) discloses a switch in which an electrically insulating screen is inserted between the contacts during the opening of the contacts. The control of the movement of the screen is obtained by propulsion means separate from those causing the separation of the contacts. Belbel et al. (U.S. Pat. No. 4,677,266) discloses another switch that has an insulating screen that adapts the breaking speed as the current increases. Brakowski et al. (U.S. Pat. No. 4,801,772) discloses a current limiting circuit interrupter in which an insulating wedge is inserted between the contact arms as they open.

Most of the prior art methods discussed above are addressed towards industrial applications. For residential use, even though the voltage and the loads are smaller, commercially available circuit breakers and GFCIs may still have a significant amount of arcing accompanying their operation. The present invention achieves interruption of electrical current with a reduction in arcing, noise and gas venting. The present invention combines an AFCI and GFCI with PTC elements and related circuits for short circuit and overload protection in a convenient form suitable for residential use in a household electrical receptacle or the like. The present invention also reduces the cost and enclosure requirements for residential circuit protection.

SUMMARY OF THE INVENTION

One aspect of the invention uses a PTC element in a GFCI receptacle in series with a load. The increased resistance of the PTC element during an overload is used to direct current in a parallel path to drive a relay or tip coil for opening the main contacts. In order to prevent heat damage to the PTC elements during a short circuit, one or more metal oxide varistors are in parallel with the PTC component. This limits the maximum voltage (and hence the amount of heating) that occurs in the PTC element.

Another aspect of the invention is the ability of a circuit breaker incorporating a PTC element to respond to ground faults. A ground fault interrupter circuit is used to energize the relay coil.

In another embodiment, a series coil is wound on the same core as the trip coil to provide additional short circuit protection.

Another embodiment of the invention uses a switching device that is triggered by a ground fault sensing circuit to sink current through the relay to open the main contacts.

In another embodiment, an arcing fault sensing circuit triggers the switching device.

Examples of the more important features of the invention have been summarized rather broadly in order that the detailed description thereof that follows may be better understood, and in order that the contributions to the art may be appreciated. These and other features of the invention that will be described hereinafter form the subject of the claims appended hereto.

DETAILED DESCRIPTION OF THE INVENTION

A GFCI (ground fault circuit interrupter) receptacle turns off electricity, usually by opening a pair of contacts, if there is leakage current to the earth (i.e., ground). The leakage is called a ground fault. A GFCI receptacle is usually mounted in a home in places like a bathroom or a kitchen, to protect people from an electrical shock. A circuit breaker is required in the circuit of a GFCI receptacle to protect the circuit from overload and/or short circuit. However, another type of potential electrical hazard may exist in a circuit protected by a GFCI, namely, arc or arcing faults. Arcing faults are unintended arcs, line to line or line to ground, that may occur in the circuit. Even low level (i.e., low current) arcs should be protected against, by interrupting (i.e., opening) the circuit. However, many of these low-level arcs cannot be detected by a circuit breaker or by a GFCI receptacle. There is existing technology for such AFCI (arc fault circuit interrupter) products, but none have been heretofore incorporated in a GFCI receptacle.

Figure 5:
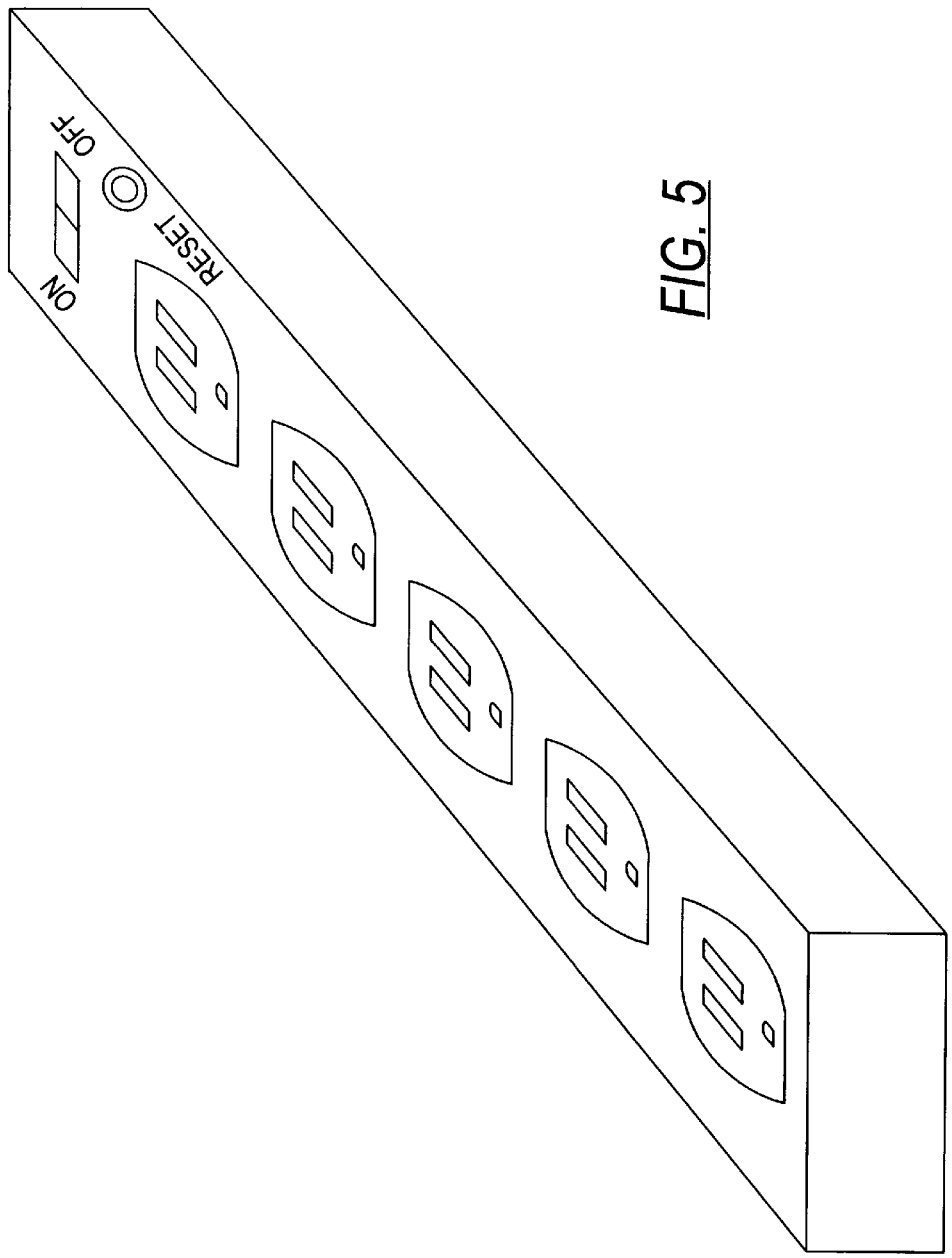
FIGS. 4 and 5 show a wall receptacle and a power strip, respectively, in which the protection device of the invention may be utilized.
Figure 4:
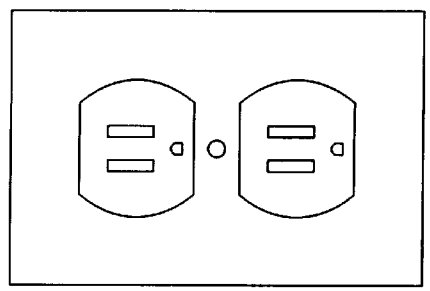

The invention provides a GFCI receptacle with an AFCI function, and further using a conductive polymer PTC (positive temperature coefficient resistivity) element to protect the circuit from short circuits and/or overloads. This GFCI receptacle may be part of a wall receptacle (FIG. 4) or part of a power strip (FIG. 5).

Figure 1:
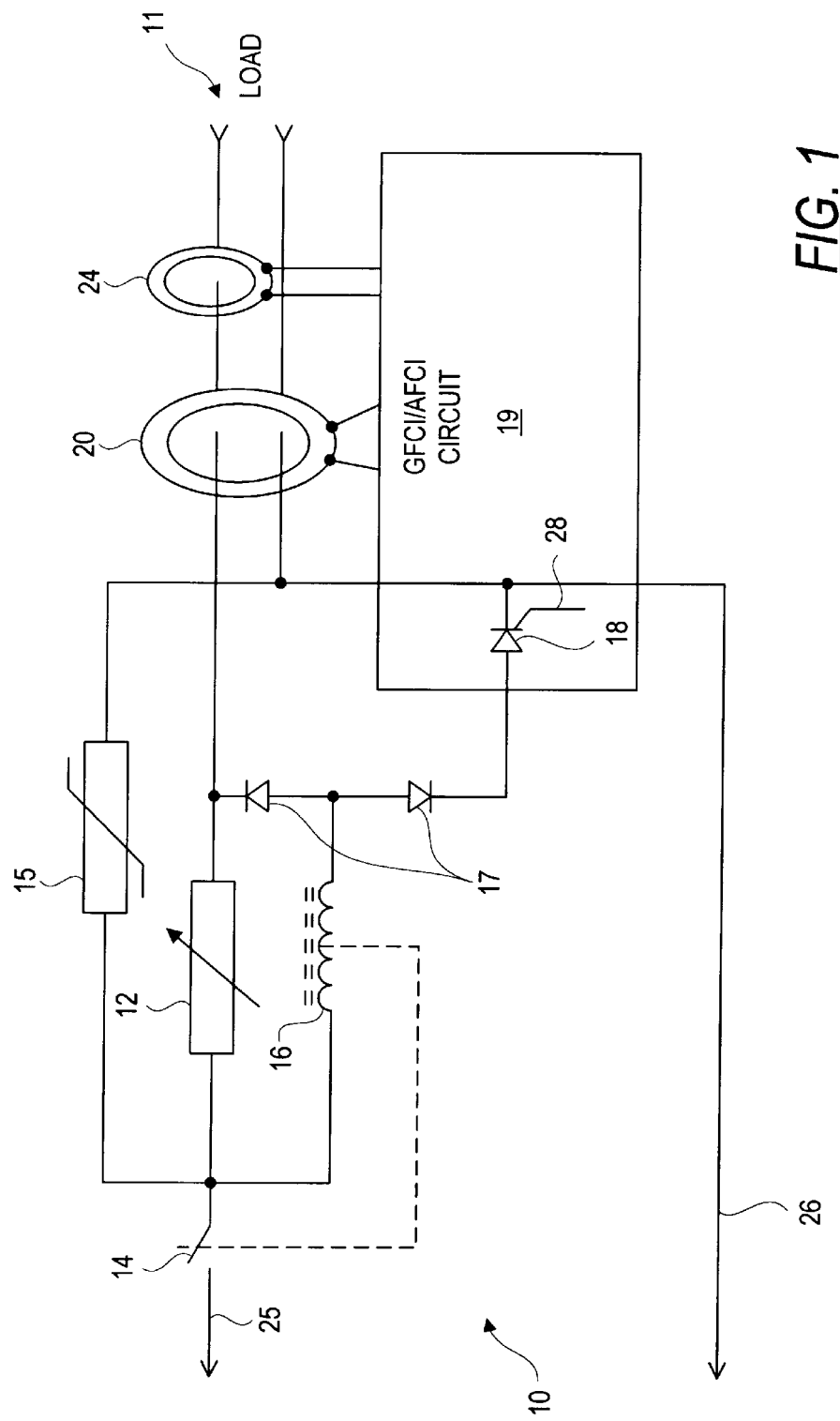
FIG. 1 shows the use of a PTC element in a protection device in accordance with one embodiment of the invention.

FIG. 1 shows a circuit protection apparatus such as a GFCI/AFCI receptacle 10 in accordance with the invention having a 115–120 VAC household plug-in type connector 11, and line and neutral conductors 25, 26. In FIG. 1, one or more PTC components 12 are connected in series with the line conductor 25. While a single PTC element 12 is shown, several PTC elements could be connected in series or in parallel to achieve the desired current rating, voltage drop or resistance. The PTC components can be conductive polymers, such as Poly-switches™ made by Raychem and Bourns, or ceramic $BaTiO_3$, or any other PTC material having a resistivity greater than 0.1 $\Omega$cm at room temperature.

A set of contacts 14 is also connected in series with the line conductor 25. The set of contacts 14 is connected in series with the PTC component 12. A metal oxide varistor (MOV) suppression device 15 and a coil 16 are respectively connected as shown relative to the PTC 12. The MOV is in parallel with the load in the circuit of FIG. 1. The suppression device 15 could be a silicon avalanche suppressor diode (SASD) instead of an MOV. Two or more MOV or SASD devices may be used (in series or in parallel) if desired to achieve the ratings consistent with those of the PTC component(s) 12. Two diodes 17 are also connected in the circuit as shown in FIG. 1.

Two different current transformers (CT) 20 and 24 are used for sensing ground and arcing faults respectively. They are connected to a circuit board 19 with GFCI/AFCI electronic components. Details of the electronic components and circuits on the board 19 are not shown in FIG. 1 for simplicity. Generally speaking, the electronic components and circuits of the circuit board 19 are responsive to the respective input signals provided by the CTs 20 and 24 for analyzing these signals and determining whether either ground faults or arcing faults are present in a lead circuit coupled to the receptacle 10. In the presence of such ground faults or arcing faults, these circuits 19 will produce an output to a trigger or control input 28 of a switching device 18 such as an SCR which is coupled in circuit between the diode 17 and the neutral conductor 26. The SCR 18 may also be mounted on the circuit board 19. One example of such AFCI/GFCI circuits which may be employed in the circuit board 19 is shown in co-pending application Ser. No. 09/026,193 filed Feb. 19, 1998 (attorney's docket no. SQRE020/NBD-27)

The receptacle 10 is designed so as to open the contacts 14 by the action of the coil 16 during a small overload such as about 135% to 200% of its nominal ampere rating. The resistance of the coil 16 is selected to be larger than that of the PTC 12 at room temperature. Under normal operations, most of the current goes through the PTC 12 instead of the coil 16. The coil 16 is energized to trip, i.e., open the contacts 14 whenever the voltage across the PTC 12 and the current through the PTC 12 and consequently, the current through the coil 16, reach certain values. During an overload, high current flowing through the PTC component(s) 12 will heat it (them) up. The resistance of the PTC component(s) 12 increases sharply as its (their) temperature increases over a threshold value. When the voltage across the PTC component(s) reaches a predetermined threshold value, the coil 16 will be energized.

During a short circuit, the large short circuit current heats up the PTC 12 very quickly (within about a millisecond) which can generate a voltage across the PTC 12 thereby increasing the current through the coil 16 to open the contacts 14 in the same fashion as for an overload, but more rapidly. The voltage across the PTC 12 is usually high enough to overcome the system voltage and limits the short circuit current. The MOV or SASD 15 provides a shunt path for the extra current during a short circuit interruption, and thus protects the PTC 12 from breaking down. The contacts 14 are opened after all the interruption energy has been consumed by the MOV or SASD 15, PTC 12, and coil 16, thereby avoiding arcing at the contacts 14.

When a ground fault occurs, the CT 20 will send a signal to the circuit board 19 proportional to the current difference between the line and neutral conductors 25, 26. In the absence of a ground fault 10, these currents should be the same. The signal will be processed by the GFCI electronic components on the board 19 to close the SCR 18. The SCR 18 is open during normal operation. As soon as the SCR 18 is closed, the coil 16 is energized to trip the receptacle.

The CT 24 monitors the line circuit and sends a signal to the board 19. Whenever there is arcing in the load circuit, the AFCI electronic components on the board 19 will respond to the corresponding signal received from the coil 24, and close the SCR 18 during an arcing fault. In this way, the circuit 10, and hence, the receptacle in which it is included can provide both ground fault and arcing fault protection. The MOV or SASD 15 is in parallel with the series combination of the PTC 12 and the load, and therefore can provide protection for the load as well, in the event of a transient voltage surge, such as lightning, or the like. The diodes 17 assure that when the SCR 18 is closed, the AC current will flow (in both directions, i.e., positive and negative half cycles) only through the coil 16, and not the PTC 12.

Figure 2:
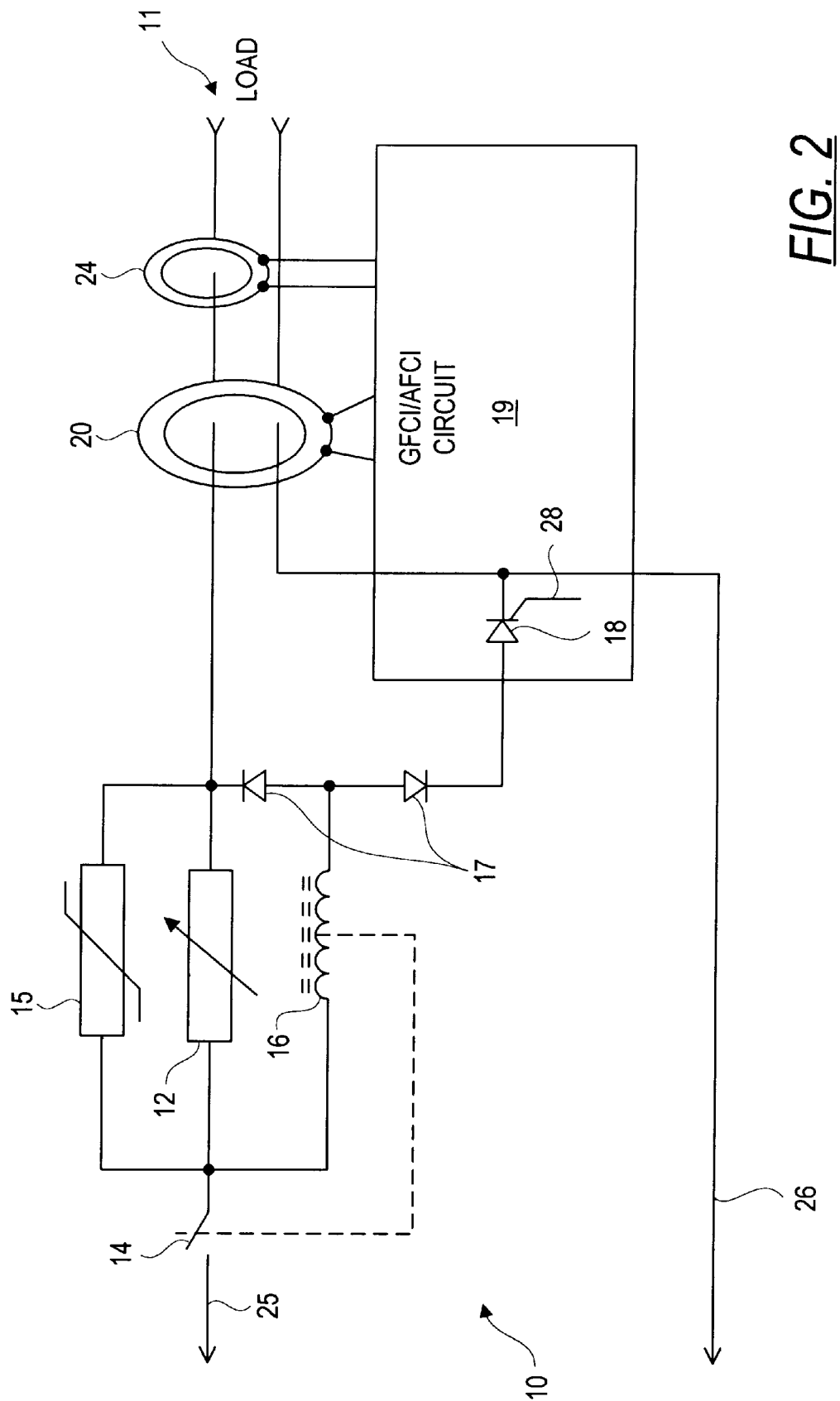
FIG. 2 shows a protection arrangement similar to FIG. 1, in accordance with another embodiment of the invention.

FIG. 2 shows another embodiment of the invention, in which like reference numerals are used to designate those components which are the same or similar to the above-described components in FIG. 1. In FIG. 2, the circuit 10 is substantially identical to that described above, however, the MOV or SASD 15 is coupled in parallel with the PTC 12. Thus, the MOV or SASD 15 protects only the PTC 12. In FIG. 1, the MOV or SASD 15 protects not only the PTC 12 during a short circuit, but also the load during a transient voltage surge, as mentioned above. The embodiment of FIG. 1 would be used when the voltage rating of PTC 12 is greater than the voltage rating of the circuit (120 VAC in the example given above). In FIG. 1, the voltage rating of the MOV or the SASD 15 should be higher than the voltage rating of the circuit (120 VAC) so that no current will pass through the MOV or SASD under normal operation. Where the voltage rating of the PTC is less than the voltage rating of the circuit, the embodiment of FIG. 2 would be used.

Figure 3:
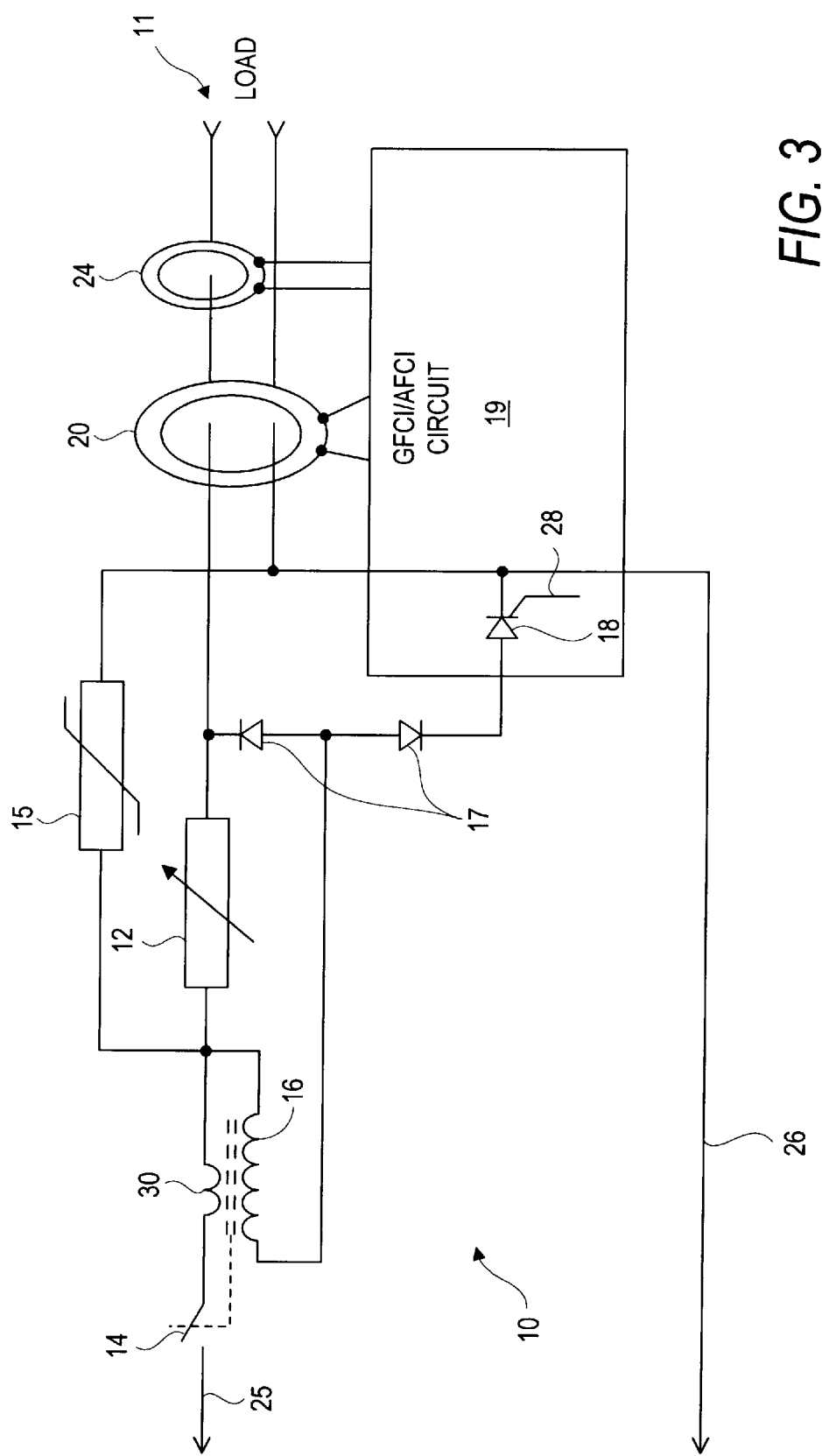
FIG. 3 shows a protection arrangement similar to FIG. 1, in accordance with another embodiment of the invention.

FIG. 3 shows another embodiment of the invention, in which like reference numerals have been used to designate those components which are the same or similar to the components described above with reference to FIGS. 1 and 2. The circuit of FIG. 3 is substantially identical to the circuit of FIG. 1, with the addition of a coil 30 in series with the line and with the PTC 12. The series coil 30 could be wound around the same core as the trip coil 16. During a short circuit, a large current passing through the series coil 30 can generate enough magnetic force to delatch the receptacle, i.e., open the contacts 14. The series coil 30 will help to open the contacts 14 quicker than the trip coil 16 alone during short circuit interruptions.

One advantage of this invention is to add an arcing fault detection and trip function to an existing GFCI receptacle. Another is to provide a GFCI/AFCI receptacle with the added capability to protect circuits from overload and short circuit. The invention could be used in an environment of existing GFCI receptacles or outlets. The invention can also be used to make protective devices other than circuit breakers and GFCI receptacles.

The circuitry can be readily incorporated into a variety of environments, such as in individual loads. This is true for industrial, as well as commercial and residential applications. For example, the circuit of the invention can be incorporated in electrically powered industrial and/or commercial equipment or machinery, as well as in consumer products such as computer equipment, audiovisual equipment, appliances or the like.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A circuit protection apparatus for interrupting the flow of electrical current in a line in response to any of a plurality of different types of fault conditions on the line, said apparatus comprising:

a set of contacts connected in series with the line, and having an open position and a closed position;

a device coupled to the contacts, adapted to be actuated by a trip signal, to move the contacts from the closed position to the open position;

an element having a positive temperature coefficient of resistivity (PTC) connected in series with the contacts, said PTC element being connected to said device to provide said trip signal to the device in response to overload or short circuit conditions in the line;

a switching element operatively coupled with said device for providing said trip signal to said device in response to an actuating signal; and a circuit adapted for detecting an arcing fault in the line and producing said actuating signal when the arcing fault is detected.

2. The apparatus of claim 1 wherein said circuit is further adapted for detecting a ground fault current in the line and producing said actuating signal when the ground fault current is detected.

3. The apparatus of claim 1 wherein said device comprises a coil operatively associated with said contacts.

4. The apparatus of claim 1 wherein said switching element has an open position and a closed position and wherein the switching element is adapted to move from the open position to the closed position in response to said actuating signal.

5. The apparatus of claim 4 wherein the switching element is an SCR.

6. The apparatus of claim 4 further compnsing a diode arrangement adapted to direct current through the device and to prevent a current from flowing through the PTC element when the switching element is in the closed portion.

7. The apparatus of claim 1 and further including a voltage limiting element coupled in circuit for protecting the PTC element during a short circuit interruption.

8. The apparatus of claim 7 wherein said voltage limiting element comprises one of a metal oxide varistor (MOV) or a silicon avalanche suppressor diode (SASD) coupled in parallel with said PTC element for providing a shunt path for extra current.

9. The apparatus of claim 7 wherein said voltage limiting element comprises one of a metal oxide varistor (MOV) or a silicon avalanche suppressor diode (SASD) coupled in parallel with the series combination of the PTC element and the load.

10. The apparatus of claim 3 and further including a second coil coupled in series with said PTC element and wound around a common core with said coil for more rapidly opening said switch during a short circuit condition.

11. The apparatus of claim 1, wherein said apparatus is housed in an electrical receptacle.

12. The apparatus of claim 1, wherein said apparatus is housed in a power strip.

13. The apparatus of claim 11 wherein said electrical receptacle is part of a power strip.

14. A ground fault receptacle having a circuit protection apparatus for interrupting the flow of electrical current in a line in response to any of a plurality of different types of fault conditions on the line, said receptacle comprising:

a set of contacts connected in series with the line, and having an open position and a closed position;

a device coupled to the contacts, adapted to be actuated by a trip signal, to move the contacts from the closed position to the open position;

an element having a positive temperature coefficient of resistivity (PTC) connected in series with the contacts, said PTC element being connected to said device to provide said trip signal to the device in response to overload or short circuit conditions in the line;

a switching element operatively coupled with said device for providing said trip signal to said device in response to an actuating signal; and a circuit adapted for detecting an arcing fault in the line and producing said actuating signal when the arcing fault is detected.

15. The receptacle of claim 14 wherein said circuit is further adapted for detecting a ground fault current in the line and producing said actuating signal when the ground fault current is detected.

16. The receptacle of claim 14 wherein said device comprises a coil operatively associated with said contacts.

17. The receptacle of claim 14 wherein said switching element has an open position and a closed position and wherein the switching element is adapted to move from the open position to the closed position in response to said actuating signal.

18. The receptacle of claim 15 wherein the switching element is an SCR.

19. The receptacle of claim 17 further comrising a diode arrangement adapted to direct current through the device and to prevent a current from flowing through the PTC element when the switching element is in the closed portion.

20. The receptacle of claim 12 and further including one of a metal oxide varistor (MOV) or a silicon avalanche suppressor diode (SASD) coupled in circuit for providing a shunt path for extra current during short circuit interruption for protecting the PTC element.

21. The receptacle of claim 20 wherein said MOV or SASD is coupled in parallel with said PTC element.

22. The receptacle of claim 18 wherein said MOV or SASD is coupled in parallel with the series combination of the PTC element and the load.

23. The receptacle of claim 14 and further including a second coil coupled in series with said PTC element and wound around a common core with said coil for more rapidly opening said switch during a short circuit condition.

24. The receptacle of claim 14 wherein said ground fault receptacle is part of a power strip.

\* \* \* \* \*